(12) United States Patent
Dokko

(10) Patent No.: US 7,432,010 B2
(45) Date of Patent: Oct. 7, 2008

(54) BATTERY

(75) Inventor: Yoshihiro Dokko, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/941,477

(22) Filed: Sep. 14, 2004

(65) Prior Publication Data

US 2005/0058898 A1 Mar. 17, 2005

(30) Foreign Application Priority Data

Sep. 17, 2003 (JP) .......................... P2003-324949

(51) Int. Cl.
*H01M 2/12* (2006.01)
(52) U.S. Cl. .......................... 429/53; 429/175; 429/64; 429/82
(58) Field of Classification Search .................... 429/64, 429/82, 54, 53, 175
See application file for complete search history.

(56) References Cited

U.S. PATENT DOCUMENTS 5,738,952 A * 4/1998 Abe .......................... 429/56

FOREIGN PATENT DOCUMENTS

| JP | 357182963 A | * | 11/1982 | ................. 429/171 |
| JP | 63-202847 | * | 8/1988 | ................. 429/306 |
| JP | 10-012215 | * | 1/1998 | ................. 429/163 |
| JP | 11-204089 | | 7/1999 | |
| JP | 2001-126682 | * | 5/2001 | ................. 429/163 |
| JP | 2001-126695 | | 5/2001 | |
| JP | 2003-187773 | | 7/2003 | |
| JP | 2001-126682 | | 11/2005 | |

* cited by examiner

*Primary Examiner*—Patrick Ryan
*Assistant Examiner*—Ben Lewis
(74) *Attorney, Agent, or Firm*—Bell, Boyd & Lloyd LLP

(57) ABSTRACT

A battery, which can inhibit raise of an internal resistance even when temperature change or mechanical shock is applied, and which has superior productivity is provided. A safety mechanism and a battery cover are installed at an open part of a battery case by caulking through a gasket. Inside of the battery case is sealed. A flange part of the battery cover contacts with a flange part of a safety valve of the safety mechanism. A surface roughness of the contact face is set to be in the range from about 0.5 μm to about 5.5 μm based on an arithmetic average roughness Ra. A contact resistance between the battery cover and the safety valve is thereby reduced. Further, a maximum height Ry of the contact face is preferably in the range from about 8.0 μm to about 50.0 μM.

10 Claims, 4 Drawing Sheets

US 7,432,010 B2

BATTERY

CROSS REFERENCES TO RELATED APPLICATIONS

This application claims priority to Japanese Patent Application No. P2003-324949 filed on Sep. 17, 2003, the disclosure of which is incorporated by reference herein.

BACKGROUND OF THE INVENTION

The present invention relates to a battery wherein a battery cover and a safety valve are overlapped at an open part of a battery case internally housing a power generation component.

In recent years, many portable electronic devices such as a mobile phone, a combination camera (video tape recorder), and a laptop computer have been introduced. Improvement in performance of these portable electronic devices has been aspired. Along with these situations, improvement in energy density, downsizing, and weight saving of a secondary battery coverable of being charged and discharged as a power source for the portable electronic device have been aspired. Specially, a lithium ion secondary battery is superior in the respect that the lithium ion secondary battery has higher energy and can be used for a longer time than a lead battery, a nickel cadmium battery and the like.

Conventionally, in order to house a power generation component, a metal battery case has been widely used for the lithium ion secondary battery. FIG. 1 shows a view which enlarges part of a battery using the metal battery case. In this battery, a power generation component 120 sandwiched between a pair of insulating plates 130 is housed inside a battery case 110. Battery covers 140 and a safety mechanism 150 provided inside the battery cover 140 are installed to an open part of the battery case 110 by caulking through a gasket 160. A safety valve 151 transformed by a given pressure is provided for the safety mechanism 150 so that the safety valve 151 is overlapped with the battery cover 140. A cathode lead 121 derived from the power generation component 120 is connected to the safety valve 151 through a contact plate 152. The battery cover 140 and the power generation component 120 are thereby electrically connected.

In such a battery wherein the battery cover 140 and the safety valve 151 are simply overlapped, however, there has been a problem that when temperature change or mechanical shock is applied, a contact resistance between the battery cover 140 and the safety valve 151 is increased, leading to increase in an internal resistance.

Therefore, as shown in FIG. 2, actions have been taken, for example, an outer periphery part of a flange part 141 of the battery cover 140, which contacts with the safety valve 151 is bent toward the safety valve 151 side (refer to Japanese Unexamined Patent Application Publication No. 2001-126682).

In the foregoing example, however, there has been a problem that process automation is difficult since when an automated machine is used in a manufacturing process, troubles may arise, for example, parts are not carried smoothly, or a carriage jig or the like is shaved by a bent part of the battery cover 140.

SUMMARY OF THE INVENTION

The present invention relates to a battery wherein a battery cover and a safety valve are overlapped at an open part of a battery case internally housing a power generation component.

The present invention in an embodiment provides a battery which can inhibit an increase of an internal resistance even when temperature change or mechanical shock is applied, and which has superior productivity.

The battery according to an embodiment is a battery wherein a battery cover and a safety valve are overlapped at an open part of a battery case internally housing a power generation component. An arithmetic average roughness of a contact face between the battery cover and the safety valve is in the range from about 0.5 μm to about 5.5 μm.

According to the battery of the invention, the arithmetic average roughness of the contact face between the battery cover and the safety valve is set to be in the range from about 0.5 μm to about 5.5 μm. Therefore, even when temperature change or mechanical shock is applied, or aging occurs, it is possible to hold down a contact resistance between the battery cover and the safety valve, and inhibit an increase of the internal resistance. Further, since carriage is not prevented, processes can be automated, and productivity is superior.

Additional features and advantages of the present invention are described in, and will be apparent from, the following Detailed Description of the Invention and the figures.

DETAILED DESCRIPTION OF THE INVENTION

The present invention relates to a battery wherein a battery cover and a safety valve are overlapped at an open part of a battery case internally housing a power generation component.

An embodiment of the present invention will be described in detail hereinbelow with reference to the drawings.

Figure 1:
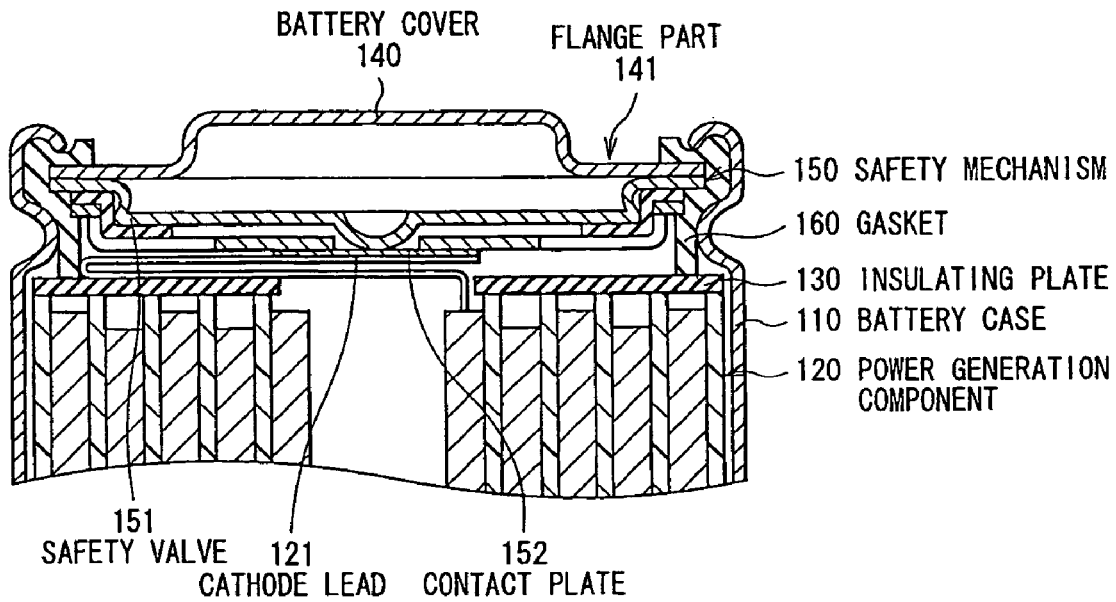
FIG. 1 is a cross sectional view showing a construction of a conventional battery.
Figure 2:
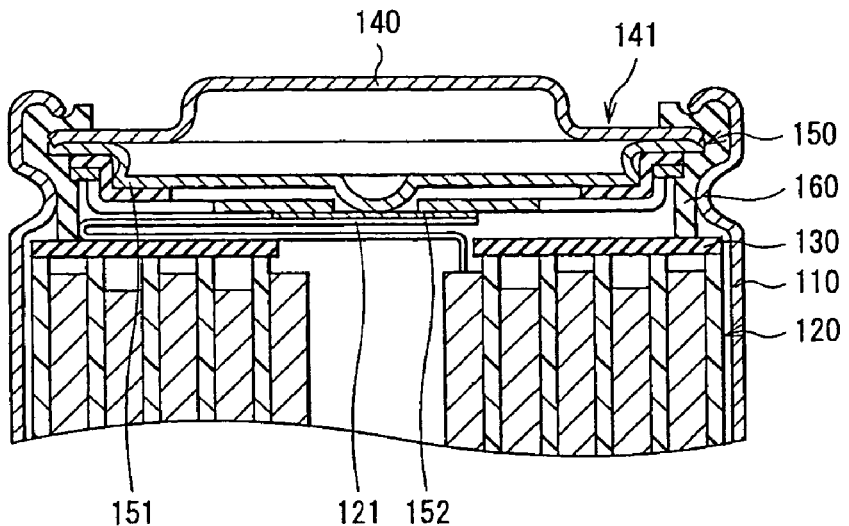
FIG. 2 is a cross sectional view showing a construction of conventional battery.
Figure 3:
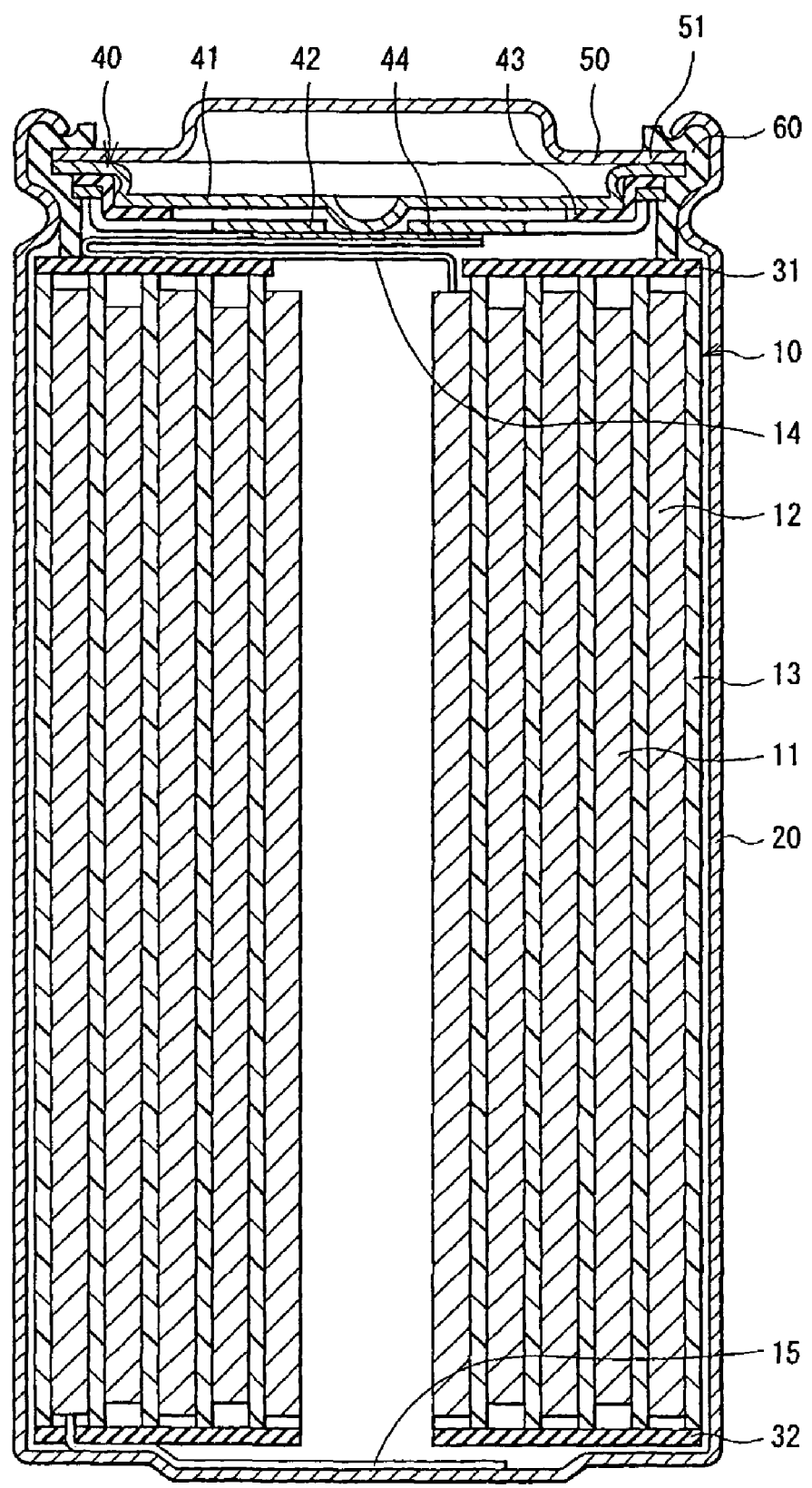
FIG. 3 is a cross sectional view showing a construction of a secondary battery according to an embodiment of the present invention.
Figure 4:
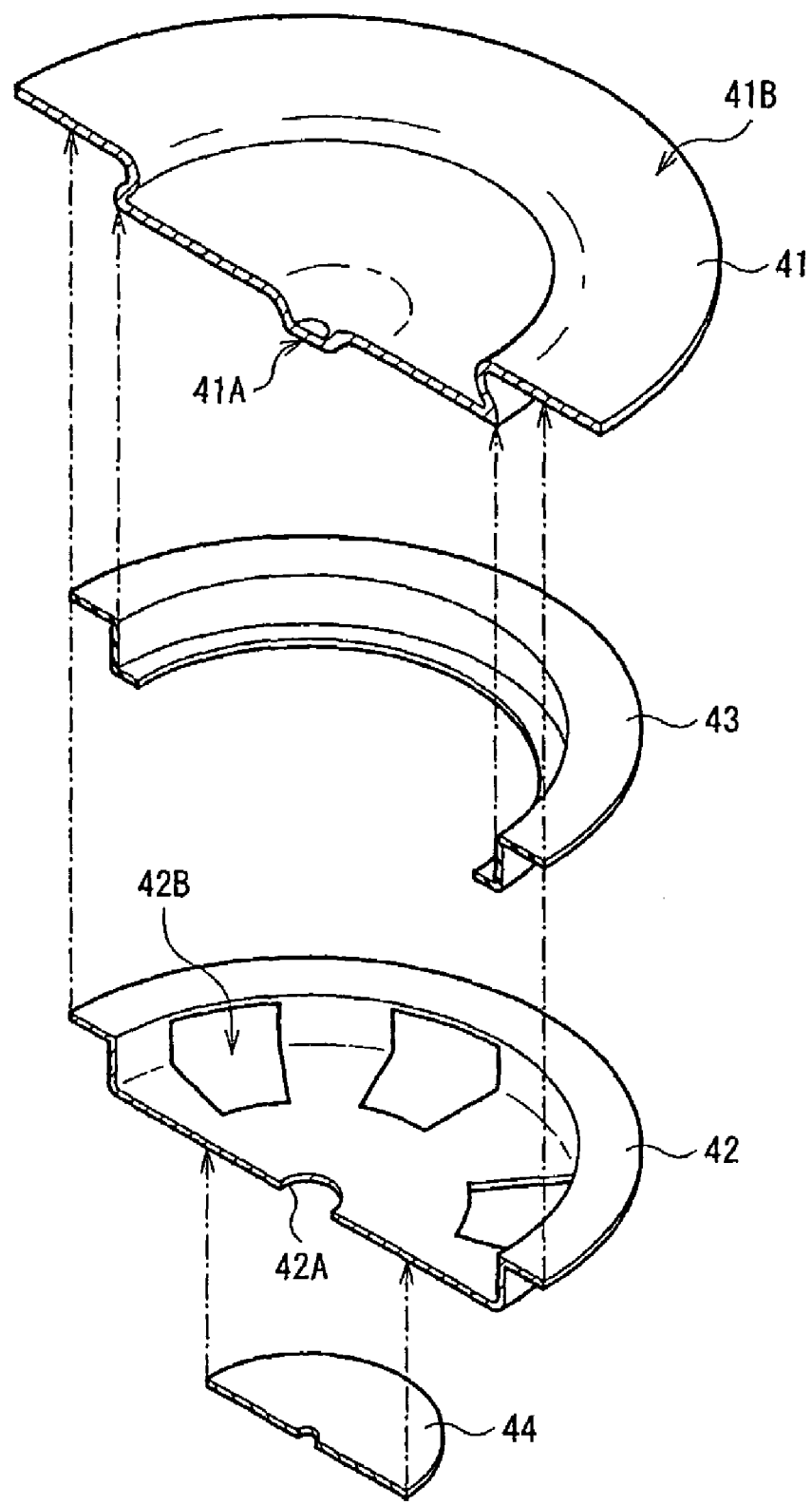
FIG. 4 is a cross sectional view showing an enlarged safety mechanism shown in FIG. 3.

FIG. 3 shows a cross sectional structure of a secondary battery according to the embodiment of the invention. FIG. 4 shows an enlarged safety mechanism shown in FIG. 3. This secondary battery is a so-called cylindrical secondary battery, wherein a power generation component 10 is housed inside a battery case 20 in the shape of approximately a hollowcylinder.

The power generation component 10 is, for example, formed by winding a strip-shaped cathode 11 and a strip-shaped anode 12 with a separator 13 in between, and impregnating the separator 13 with an electrolytic solution, which is a liquid electrolyte. The cathode 11 has a structure, for example, wherein a cathode mixture layer containing a cathode material capable of inserting and extracting lithium (Li) as a cathode active material is provided on both sides or a single side of a cathode current collector made of an aluminum (Al) foil or the like. A cathode lead 14 made of aluminum or the like is attached to the cathode current collector, and derived outside the power generation component 10. The anode 12 has a structure, for example, wherein an anode mixture layer containing an anode material capable of inserting and extracting lithium as an anode active material is provided on both sides or a single side of an anode current collector made of a copper (Cu) foil or the like. An anode lead 15 made of copper or the like is attached to the anode current collector, and derived outside the power generation component 10. The separator 13 is, for example, made of a porous film of a synthetic resin or ceramics. The electrolytic solution contains, for example, a solvent such as an organic solvent and a lithium salt as an electrolyte salt dissolved in this solvent. A pair of insulating plates 31 and 32 is arranged on a winding periphery face of the power generation component 10.

The battery case 20 is, for example, made of iron (Fe) or a stainless steel plated with nickel (Ni). One end side of the battery case 20 is closed, and the other end side is opened. The anode lead 15 is welded to the closed part of the battery case 20, which functions as an anode terminal. A safety mechanism 40 and a battery cover 50 are attached to the open part of the battery case 20 by caulking through a gasket 60. Inside of the battery case 20 is sealed.

In the safety mechanism 40, a safety valve 41 made of a metal material such as aluminum and a support holder 42 made of a metal material such as aluminum are fit with an insulating holder 43 made of an insulating material such as polybutylene terephthalate in between, and a disc-shaped contact plate 44 made of a metal material such as aluminum is welded to a bottom part of the support holder 42. The safety valve 41 includes, for example, a projecting part 41A which is placed in the center of the bottom part of the safety valve 41 and which projects toward the power generation component 10 side. The projecting part 41A is inserted into an opening 42A provided in the center of the bottom part of the support holder 42, and contacts with the contact plate 44. Further, the safety valve 41 is provided with a flange part 41B at an outer periphery of the safety valve 41 to secure electrical connection with the battery cover 50. Further, the support holder 42 is provided with a plurality of openings 42B on a side wall of the support holder 42, respectively. The cathode lead 14 is welded to the contact plate 44. It is possible to connect the cathode lead 14 to the projecting part 41A of the safety valve 41 instead of providing the contact plate 44.

In this safety mechanism 40, when an internal pressure of the battery is raised to a given value due to internal short circuit or heating from outside, the raised internal pressure is transmitted to the safety valve 41 through the openings 42B of the support holder 42. The safety valve 41 is transformed, for example, toward the battery cover 50 side due to the internal pressure. The internal pressure inside the battery is thereby modified, and electrical connection between the safety valve 41 and the cathode lead 14 is thereby broken. Therefore, electrical connection between the battery cover 50 and the power generation component 10 is broken.

The battery cover 50 closes the battery case 20, as well as functions as a cathode terminal. For example, as the battery can 20, the battery cover 50 is made of a stainless steel plated with nickel, and has a flange part 51 at a periphery of the battery cover 50. The flange part 51 contacts with the flange part 41B of the safety valve 41. A surface roughness of the contact face S is set to be in the range from about 0.5 μm to about 5.5 μm, and more preferably about 0.6 μm or more based on an arithmetic average roughness Ra specified by JISB0601. When the arithmetic average roughness Ra is too small or too large, a contact resistance between the battery cover 50 and the safety valve 41 becomes large. The surface roughness of the contact face S is preferably in the range from about 8.0 μm to about 50.0 μm based on a maximum height Ry specified by JISB0601. In this range, a contact resistance between the battery cover 50 and the safety valve 41 can be significantly reduced.

In this secondary battery, when charged, for example, lithium ions are extracted from the cathode 11, and inserted in the anode 12 through the electrolytic solution. When discharged, for example, lithium ions are extracted from the anode 12, and inserted in the cathode 11 through the electrolytic solution. Here, the surface roughness of the contact face S of the battery cover 50 is in the specified range. Therefore, even when temperature change or mechanical shock is applied, or aging is arisen, a contact resistance between the battery cover 50 and the safety valve 41 is held down, and raise of the internal resistance is inhibited.

The secondary battery in an embodiment can be manufactured, for example, as follows.

First, for example, a cathode material capable of inserting and extracting lithium, a conductive agent, and a binder are mixed to prepare a cathode mixture. This cathode mixture is dispersed in a mixed solvent to obtain a cathode mixture slurry. Next, the cathode mixture slurry is applied to the cathode current collector and dried. Then, the resultant is compression-molded to form the cathode mixture layer and form the cathode 11. After that, the cathode lead 14 is jointed to the cathode current collector by ultrasonic welding or spot welding.

Further, for example, an anode material capable of inserting and extracting lithium and a binder are mixed to prepare an anode mixture. This anode mixture is dispersed in a mixed solvent to obtain an anode mixture slurry. Next, the anode mixture slurry is applied to the anode current collector and dried. Then, the resultant is compression-molded to form the anode mixture layer and form the anode 12. After that, the anode lead 15 is jointed to the anode current collector by ultrasonic welding or spot welding.

Subsequently, the cathode 11 and the anode 12 are wound several times with the separator 13 in between to fabricate a winding electrode body. After that, the winding electrode body is sandwiched between the pair of insulating plates 31 and 32, and housed in the battery can 20. The cathode lead 14 is welded to the contact plate 44 of the safety mechanism 40, and the anode lead 15 is welded to the battery can 20.

An electrolytic solution is prepared by dissolving an electrolyte salt in a solvent. After that, the electrolytic solution is injected inside the battery can 20, and impregnated into the separator 13. Subsequently, the safety mechanism 40 and the battery cover 50 are fixed at the open part of the battery can 20 by caulking through the gasket 60. The secondary battery of this embodiment is thereby completed.

As above, in this embodiment, the surface roughness of the contact face S of the battery cover 50 is set to be in the range from about 0.5 μm to about 5.5 μm based on the arithmetic average roughness Ra. Therefore, when temperature change or mechanical shock is applied, or aging is arisen, a contact resistance between the battery cover 50 and the safety valve 41 is held down, and raise of the internal resistance can be inhibited. Further, since carriage is not interfered, processes can be automated and productivity is superior.

In particular, when the surface roughness of the contact face S is in the range from about 8.0 μm to about 50.0 μm based on the maximum roughness Ry, raise of the internal resistance can be significantly inhibited.

EXAMPLES

The following description illustrate examples of the present invention according to various embodiments.

As Examples 1 to 8, the secondary batteries described in the embodiment were fabricated. The battery cover 50 was made of a stainless steel plated with nickel (JIS SUS430). The safety valve 41 was made of aluminum. In Examples 1 to 8, the surface roughness of the contact face S of the battery cover 50 was changed based on the arithmetic average roughness Ra and the maximum height Ry as shown in Table 1 or Table 2. Further, as Comparative examples 1 and 2 in relation to Examples 1 to 8, secondary batteries were fabricated in a manner similar to in Examples 1 to 8, except that the surface roughness of the contact face S of the battery cover 50 was changed based on the arithmetic average roughness Ra and the maximum height Ry, respectively as shown in Table 1 or Table 2.

TABLE 1

|   | Arithmetic average roughness Ra (μm) | Maximum height Ry (μm) |
|---|---|---|
| Example 1 | 0.5 | 5.5 |
| Example 2 | 0.8 | 8.4 |
| Example 3 | 1.7 | 12.5 |
| Example 4 | 5.0 | 36.0 |
| Comparative example 1 | 0.1 | 1.3 |

TABLE 2

|   | Arithmetic average roughness Ra (μm) | Maximum height Ry (μm) | Value of rise of contact resistance after mechanical shock (mΩ) |
|---|---|---|---|
| Example 5 | 0.83 | 8.4 | 3.5 |
| Example 6 | 1.41 | 9.8 | 0 |
| Example 7 | 2.10 | 18.6 | 0.8 |
| Example 8 | 5.50 | 38.3 | 0.5 |
| Comparative example 2 | 0.12 | 1.26 | 50 or more |

Regarding the fabricated secondary batteries of Examples 1 to 4 and Comparative example 1, a heat shock cycle test, in which a cycle that the secondary batteries were retained for two hours at −20° C., and then the temperature was raised up to +60° C. in five minutes to retain the secondary batteries for two hours at +60° C., and subsequently temperature was lowered down to −20° C. in five minutes was repeated, was conducted. Then, each contact resistance between the battery cover 50 and the safety valve 41 for each cycle was obtained. The results are shown in FIG. 5.

Regarding the fabricated secondary batteries of Examples 5 to 8 and Comparative example 2, a mechanical shock test, in which shock was given for 30 minutes at 66 rpm in an octagonal barrel having a diameter of 250 mm made of a stainless steel was conducted. In result, in any of the secondary batteries of Examples 5 to 8 and Comparative example 2, each contact resistance between the battery cover 50 and the safety valve 41 was raised. Table 2 shows the values of rise of contact resistance.

Figure 5:
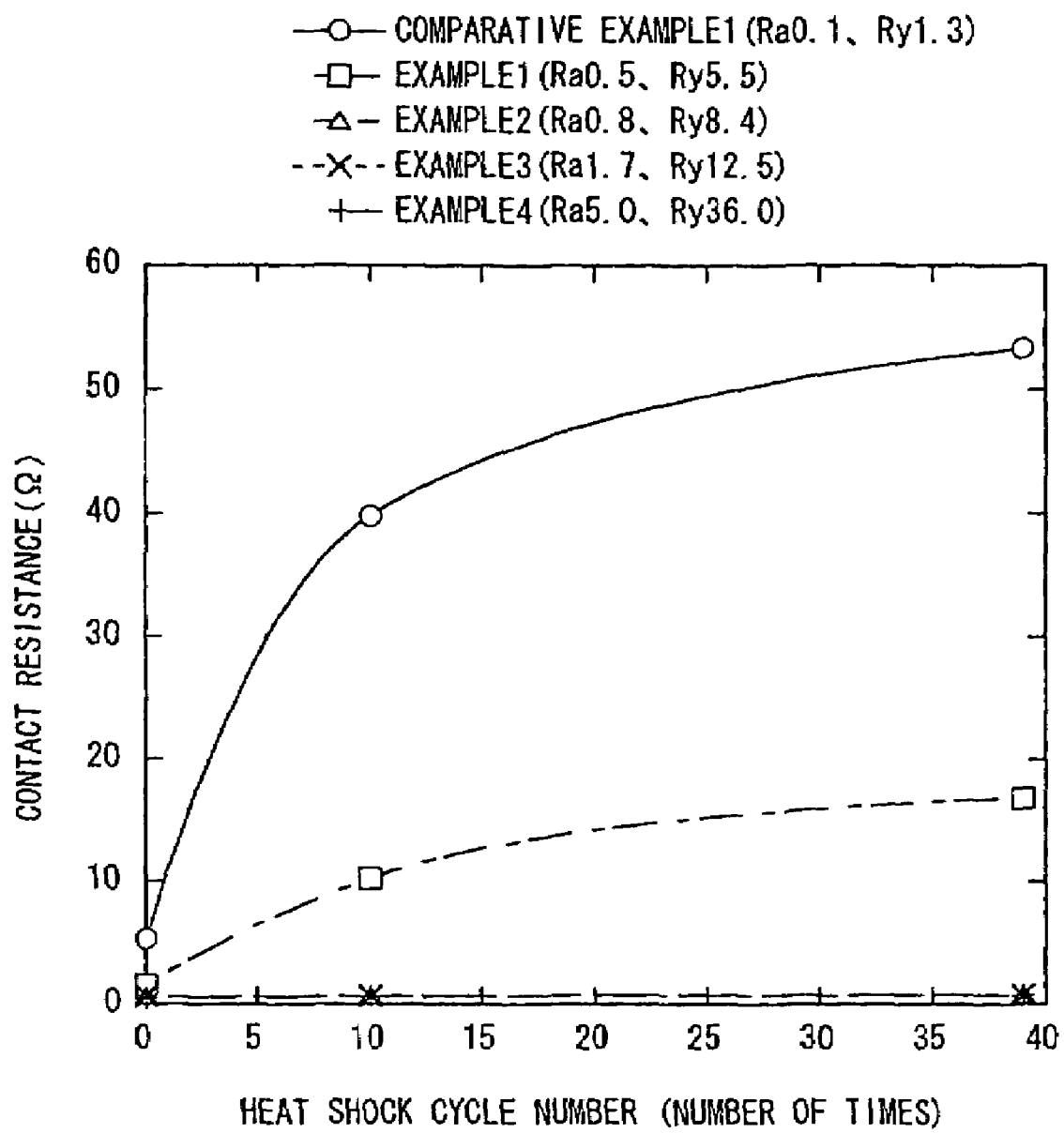
FIG. 5 is a characteristics diagram showing results of a heat shock cycle test according to Examples 1 to 4.

As evidenced by FIG. 5, according to Examples 1 to 4, when the cycle number was increased, the contact resistance was not changed. Meanwhile, in Comparative example 1, as the cycle number was increased, the contact resistance was increased. Further, as evidenced by Table 2, according to Examples 5 to 8, the value of rise of contact resistance could be reduced compared to in Comparative example 2.

That is, it was found that, when the surface roughness of the contact face S was in the given range, the contact resistance between the battery cover 50 and the safety valve 41 could be held down even if temperature change or mechanical shock was applied.

While the present invention has been described with reference to various embodiments as discussed above, the present invention is not limited to the foregoing discussion, and various modifications may be made. For example, in the foregoing, the safety valve 41 is made of aluminum, and the battery cover 50 is made of a stainless steel plated with nickel. However, materials are not limited to such materials, and any metal material which does not damage functions of the battery can be used. However, it is desirable that a hardness of a component material for the safety valve is lower than of a component material for the battery cover.

In the foregoing, descriptions have been given by taking the cylindrical battery case 20 as an example. However, a shape of the battery case 20 is not particularly limited, for example, can be rectangle.

Further, in the foregoing, descriptions have been given of the construction of the power generation component 10 by taking a concrete example. However, other suitable construction can be used. For example, the cathode and the anode can be interfolded or layered. Further, for an electrolyte, a gelatinous electrolyte in which an electrolytic solution is held in a high molecular weight compound, a high molecular weight solid electrolyte in which an electrolyte salt is dispersed in a high molecular weight compound, or an inorganic solid electrolyte comprised of ion conductive ceramics, ion conductive glass, ionic crystal or the like can be used instead of the electrolytic solution.

Further, in the foregoing embodiment, descriptions have been given of the case wherein the invention is applied to the secondary battery. However, the invention present can be applied to the primary battery.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A battery comprising a battery cover and a safety mechanism that are overlapped at an open part of a battery case internally housing a power generation component, wherein the safety mechanism comprises a safety valve and a support holder that are fit with an insulating holder in between and a disc-shaped contact plate is welded to a bottom part of the support holder;

wherein the safety valve comprises a projecting part that contacts the disk-shaped contact plate and is placed in the center of the bottom part of the safety valve and projects toward the power generation component side; and wherein an arithmetic average roughness of a contact face of the battery cover that contacts a portion of the safety valve ranges from about 0.5 μm to about 5.5 μm, and the maximum roughness height of the contact face of the battery cover ranges from about 8.0 μm to about 50.0 μm.

2. The battery according to claim 1, wherein the battery cover includes stainless steel.

3. The battery according to claim 1, wherein the safety valve includes aluminum.

4. The battery according to claim 1, wherein the projecting part of the safety valve is inserted into an opening provided in the center of the bottom part of the support holder, and contacts with the contact plate, wherein the safety valve is provided with a flange part at an outer periphery of the safety valve to secure electrical connection with the battery cover;

wherein the support holder is provided with a plurality of openings on a side wall of the support holder; and wherein the cathode lead is welded to the contact plate.

5. The battery according to claim 1, wherein a value of rise contact resistance after mechanical shock ranges from 0 mΩ to 500 mΩ.

6. The battery according to claim 1 wherein the arithmetic average roughness is greater than about 0.6 μm.

7. The battery according to claim 1 wherein the arithmetic average roughness is greater than about 0.8 μm.

8. The battery according to claim 1, wherein the maximum roughness height is greater than about 8.4 μm.

9. The battery according to claim 1 wherein the arithmetic average roughness ranges from about 0.8 μm to about 5.0 μm.

10. The battery according to claim 1, wherein the maximum roughness height is greater than 8.4 μm to about 38.3 μm.

* * * * *